United States Patent [19]

Haner

[11] 4,227,134
[45] Oct. 7, 1980

[54] SPINDLE ROTATOR

[75] Inventor: Lambert Haner, Rocky River, Ohio

[73] Assignee: Acme-Cleveland Corporation, Highland Heights, Ohio

[21] Appl. No.: 1,151

[22] Filed: Jan. 5, 1979

[51] Int. Cl.$^2$ .................................................. G05B 19/40
[52] U.S. Cl. ........................................ 318/685; 318/14; 318/15; 318/571
[58] Field of Search .................. 318/685, 612, 613, 12, 318/14, 15, 599, 571, 39; 310/76, 77, 78

[56] References Cited

U.S. PATENT DOCUMENTS

| | | | |
|---|---|---|---|
| 3,268,785 | 8/1966 | Gerber et al. | 318/685 X |
| 3,849,714 | 11/1979 | Goretzki et al. | 318/685 |
| 3,857,079 | 12/1974 | Wake et al. | 318/571 X |
| 3,946,298 | 3/1976 | van de Loo | 318/685 |

*Primary Examiner*—B. Dobeck
*Attorney, Agent, or Firm*—Pearne, Gordon, Sessions

[57] ABSTRACT

A machine tool such as a multiple spindle automatic machine tool is provided with a motor acting through a slippable clutch on each of the multiple spindles to rotate the spindles and each spindle is provided with a brake to brake each spingle to a stop. A spindle rotational means is provided to rotate the spindle at a speed less than that established by full engagement of the clutch. This is accomplished by partial engagement of each the clutch and brake so that each slips. A spindle positioning means is further provided to position the spindle at a desired arcuate position. At such time the clutch is disengaged and the spindle is locked in rotational position. The clutch and brake are differentially controlled to control the relative average torque transmission therethrough to maintain a desired slow speed. The foregoing abstract is merely a resume of one general application, is not a complete discussion of all principles of operation or applications, and is not to be construed as a limitation on the scope of the claimed subject matter.

20 Claims, 9 Drawing Figures

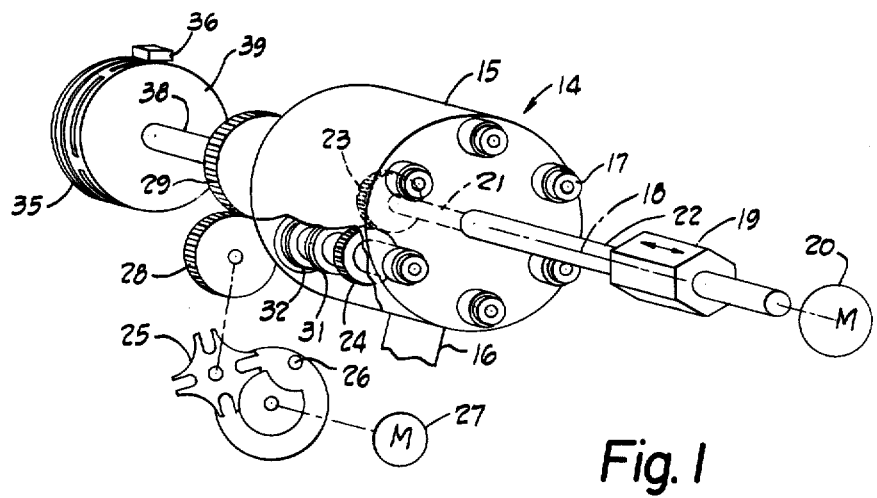
Fig. 1
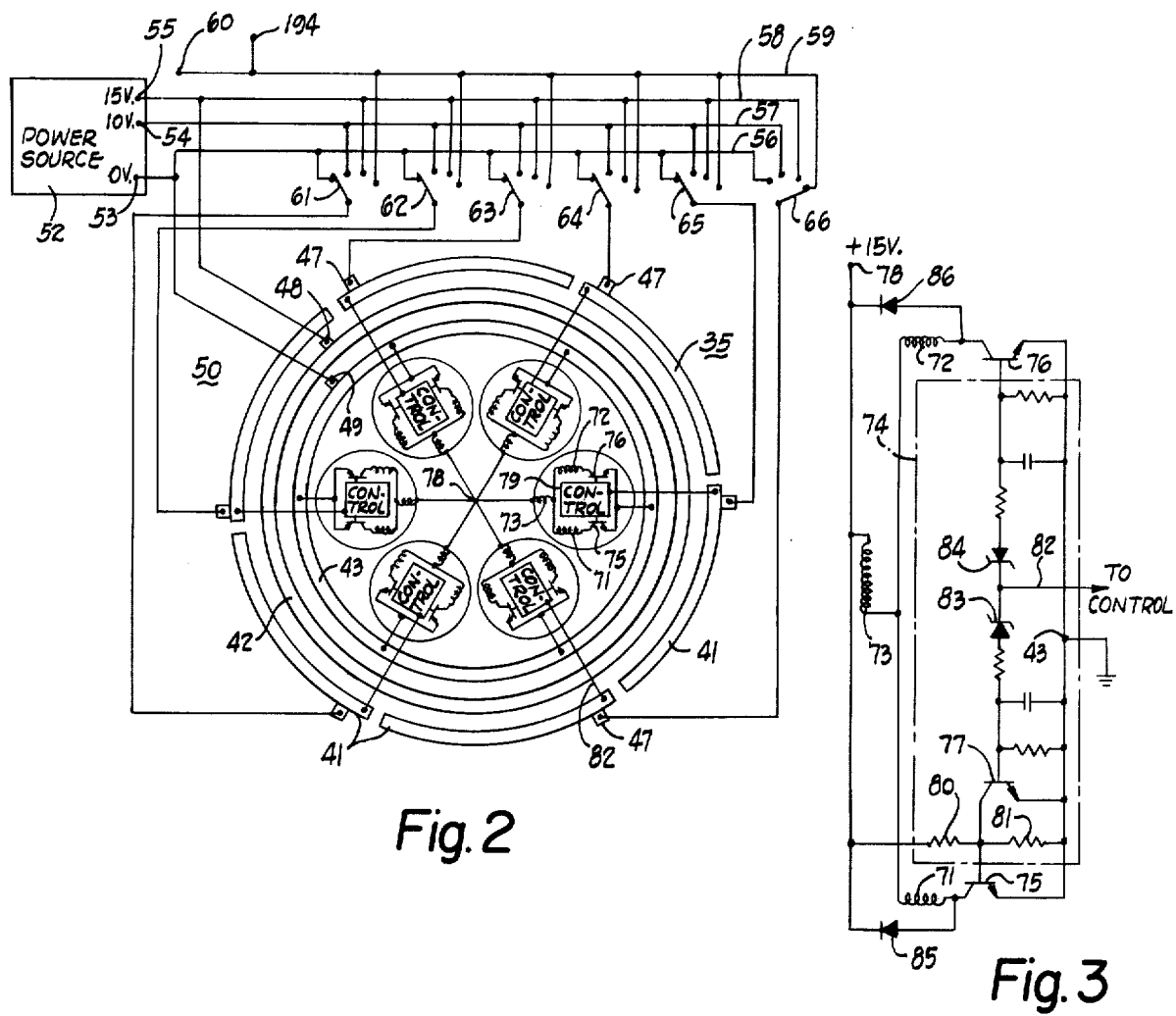
Fig. 2
Fig. 3

SPINDLE ROTATOR

BACKGROUND OF THE INVENTION

U.S. Pat. No. 3,946,298 showed a spindle positioning system for a multiple spindle automatic machine tool wherein the workpiece spindle was rotated at a relatively slow speed by a servo-motor separate from the main motor normally driving the spindle for workpiece machining. A counter circuit counted pulses to angularly position the spindle relative to a reference angle. Such spindle positioner required considerable additional mechanism and hence was relatively expensive. Additionally, when spindles in two different spindle positions in a multiple spindle machine required positioning, then two separate servo-motors and control systems were required.

U.S. Pat. No. 3,643,307 indicates another prior art arrangement for positioning a spindle of a multiple spindle machine tool. A clutch and a brake are provided for each spindle between the main motor 95 and the spindle. A separator motor 103 is provided to slowly rotate the spindle to a desired position at which a counter 111 counts to zero. This is also a cumbersome arrangement and must be duplicated if spindle positioning at a different work station of the spindle carrier is desired.

The problem to be solved is how to accomplish a relatively slow-speed low-torque rotation of a spindle in a machine tool and further how the spindle may be accurately angularly positioned.

SUMMARY OF THE INVENTION

This problem is solved by a machine tool having a motor connectable to rotate a spindle, wherein the improvement comprises, spindle rotational means including; first and second torque couplings with said first coupling connected between said motor and said spindle to rotate the spindle directly in proportion to the motor speed and said second coupling connected to said spindle to establish a different speed condition of said spindle, means 88 to partially engage each of said torque couplings for torque transmission therethrough, and means 89 to control the relative average torque transmission of said first and second torque couplings to rotate said spindle from said motor at a speed slower than rotation of said spindle from said motor by actuation of said first torque coupling without actuation of said torque coupling.

An object of the invention is to provide a spindle rotational means which will achieve a low-torque and low-speed rotation of a machine tool spindle.

Another object of the invention is to provide a spindle positioning means which will permit accurate angular positioning of a machine tool spindle in an economical manner.

Another object of the invention is to provide a clutch and brake combination wherein a brake is partially engaged to provide a retarding torque during drive of the spindle through the clutch.

Another object of the invention is to provide a spindle rotating and positioning mechanism for a multiple spindle machine tool wherein it is not necessary to provide two separate servo-motors in order to position spindles in two different spindle positions of the machine tool.

Another object of the invention is to provide a clutch and brake combination for spindle rotation and positioning which eliminates much of the mechanical time delay.

Another object of the invention is to provide a clutch and brake combination for spindle rotation and positioning which eliminates much of the electrical time delay.

Still another object of the invention is to provide a position sensing and a position holding mechanism which may be combined into a single mechanism.

Other objects and a fuller understanding of the invention may be had by referring to the following description and claims, taken in conjunction with the accompanying drawing.

BRIEF DESCRIPTION OF THE DRAWING

FIG. 1 is a simplified isometric view of multiple spindle automatic machine tool incorporating the invention;

FIG. 2 is an electrical circuit and schematic diagram of the controls for the clutches and brakes on each spindle of the machine tool;

FIG. 3 is a schematic diagram of the power handling circuit used to control the clutches and the brakes on each spindle;

DESCRIPTION OF THE PREFERRED EMBODIMENTS

Figure 4:
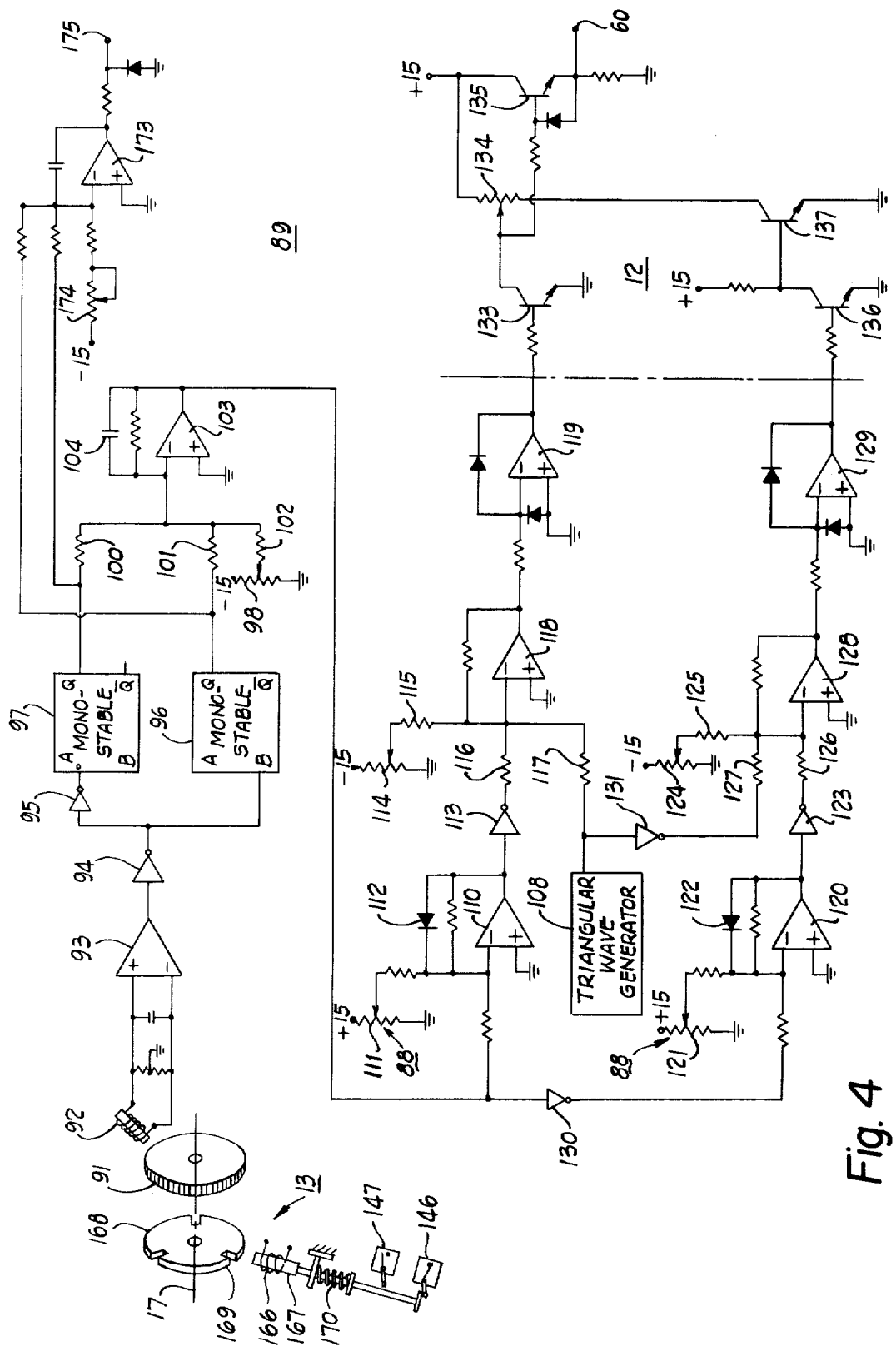
FIG. 4 is a combined schematic diagram and electrical circuit for the control of slow speed spindle rotation and positioning.

The drawing illustrates spindle rotational means 12 and spindle positioning means 13 which may be used in a machine tool 14. This machine tool is illustrated as a multiple spindle machine tool having a spindle carrier 15 journaled in a headstock frame 16 and in turn journalling a plurality of spindles 17, shown, for example, as six in number in FIG. 1. Other numbers of spindles also may be used, such as four or eight. The spindles 17 are journaled on axes parallel to the spindle carrier axis 18. The spindles 17 in the usual manner carry workpieces, either chucked workpieces or long bar workpieces passing through the spindles. Workpieces, not illustrated, extend to the right of the spindles in FIG. 1 into a tooling area to be worked on by the usual tools of the machine tool. As an example, tools may be mounted on an end tool slide 19 which may reciprocate along the axis 18 to carry the tools to and from the workpieces in the spindles. Drive means to rotate each of the spindles is provided, and this is illustrated by a motor 20 which may be in the gear box or right end of the machine in this view of FIG. 1. The motor 20 drives through a spindle drive shaft 21 passing coaxially inside a spindle carrier stem 22 to a central drive gear 23. Gears such as gear 24 are coaxially journaled on each of the plurality of spindles 17 and these gears, six in this case, mesh with the central gear 23.

Means is provided to index the spindle carrier 15 and this is illustrated as a Geneva cross 25 indexed by a drive roller 26 driven by any suitable source such as the motor 20 or, as illustrated, by the motor 27. The Geneva cross 25 is connected through gears 28, 29 to index the spindle carrier 15 an appropriate amount, 60° in this case of six spindles. For n spindles the indexing would be 1/n of a revolution. Each spindle is provided with a clutch 31 and a brake 32. Each spindle 17 in the spindle carrier 15 has a first torque coupling connection through the associated clutch 31 to the drive gear 24 and has a second torque coupling connection through the associated brake 32 to the spindle carrier 15 to brake the spindle relative to the spindle carrier. FIG. 1 at the left end also shows a conductor assembly 35 which in this preferred embodiment is fastened for rotation with the spindle carrier 15. A brush carrier assembly 36 coacts with the conductor assembly 35 and is stationary on the frame 16. In this manner relative rotation between the assemblies 35 and 36 is provided in accordance with the relative indexing movement of the spindle carrier 15.

A shaft 38 is fixed to the spindle carrier and indexes therewith. A drum 39 is fixed on this shaft 38 and carries the conductor assembly 35. This conductor assembly has first, second and third conductor rings 41, 42 and 43, respectively as shown schematically in FIG. 2. The first conductor ring 41 is segmented into n segments of equal arcs with n being the number of spindles in the machine, six in this case. The second and third conductor rings 42 and 43 are annular slip rings.

The brush carrier assembly 36 includes an insulating holder carrying brushes 47, 48 and 49 for cooperation with the conductor rings 41, 42 and 43, respectively. The insulating holder is mounted on a fixed part of the frame 16. There is at least one brush carrier assembly 36 and as many as six brush carrier assemblies could be used with the six spindle machine in order to be able to control brake, clutch and neutral conditions of the spindles in any desired indexable position on the spindle carrier. Where only one brush carrier assembly 36 is used it is provided on the frame 16 at that spindle carrier position whereat brake condition of the spindle is desired.

FIG. 2 shows schematically a distributing circuit 50 used with the spindle rotational means 12. In this case the conductor assembly 35 is shown schematically in the form of a disc, although FIG. 1 illustrates it as being actually in the form of a drum. Either construction may be used. The brush carrier assembly 36 is shown as including the brushes 48 and 49 and n brushes 47. As stated above, any number of these brushes 47 may be used from one up to the number n.

The distributing circuit 50 of FIG. 2 shows a power source 52 which supplies DC voltages of only a single polarity to the electrical coupling control. This power supply 54 has first and third terminals 53 and 55 supplying power and a second terminal 56 supplying a control voltage. The potential of the second terminal is intermediate that of the first and third terminals. As an example, the voltages may be zero, 10, and 15 volts DC on the first, second and third terminals, respectively.

Bus bars 56, 57, 58 and 59 are provided, with bus bars 56, 57 and 58 connected to the terminals 53, 54 and 55, respectively. Up to n selector switches may be provided, and FIG. 2 shows six such switches 61–66. Each of these selector switches has four conditions, and with mechanical switches these are physical contacts connected to the bus bars 56, 57, 58 and 59, respectively, to select the clutch, neutral, brake and control conditions respectively. Bus bar 59 is connected to an output terminal 60, for slow spindle rotation, as described below. The movable blade of each of these switches is connected to one each of the brushes 47 which are disposed at equal angles around the conductor assembly 35 to cooperate with a different arcuate segment of the first conductor ring 41. These selector switches 61–66 in conjunction with the n segments of the conductor 41 provide selector means to provide electrical energization to the coil means in each of the spindles for selective clutch or brake actuation.

FIG. 2 illustrates schematically the six spindles within the center of the conductor assembly 35, and this is merely a schematic representation. Each of these spindle units is identical and contains a clutch coil 71 and a brake coil 72. Additionally, a spindle degaussing coil 73 is provided. As illustrated in FIG. 2 the degaussing coil 73 is connected in series to be energized whenever either the clutch coil 71 or brake coil 72 is energized. FIG. 1 shows the degaussing coil 73 positioned close to the nose of the spindle 15. Coil 73 is wound in opposition and has the same ampere-turns as each of the clutch and brake coils. This reduces the flux from the clutch or brake coils being transmitted to the spindle nose where it might magnetically attract chips cut from the workpiece.

Actuation means is provided to energize the clutch and brake coils, respectively, and these include semiconductors shown as a first transistor 75 in series with the clutch coil 71 and a second transistor 76 in series with the brake coil 72. The common connection of these transistors is connected to the third conductor ring 43. The degaussing coils for each spindle are connected at a common point 78 which in turn is connected to the second conductor ring 42. By this means, power, for example, 15 volts DC is continuously supplied to the actuation means. A power handling circuit 74 is provided for each of the spindle clutch and brake units to control the proper actuation of each clutch and brake unit.

FIG. 3 shows one of the power handling circuits 74, and there are n such units as shown in FIG. 2. FIG. 3 illustrates the common connection point 78 and also illustrates ground or zero potential which is connected as shown in FIG. 2 to the third conductor ring 43. The clutch coil 71 is shown connected in series with the degaussing coil 73 and with the first transistor 75 between these power terminals 78 and 43. Also the brake coil 72 is connected in series with the degaussing coil 73 and the second transistor 76 between these same DC source terminals. The power handling circuit 74 includes a third transistor 77 which is connected in circuit with the first transistor 75 to be alternatively conducting therewith. Bias resistors 80 and 81 are connected between the source terminals 78 and 43 to bias into conduction the first transistor 75. This transistor thus normally causes the clutch 31 to be engaged when no voltage, either zero voltage or an open circuit, is supplied to the respective arcuate segment of the first conductor ring 41. A control conductor 82 is shown connected to first and second breakdown diodes such as Zener diodes 83 and 84. These Zener diodes are connected in circuit with the bases of the transistors 77 and 76 respectively. These breakdown diodes have breakdown potentials less than the potentials on the second and third power source terminals 54 and 55, respectively. For example, if the power source terminals 54 and 55 are 10 and 15 volts, then diodes 83 and 84 may have breakdown potentials of 6 and 12 volts, respectively.

The above-described machine tool 14 is an illustration of one machine on which the spindle rotational means 12 and spindle positioning means 13 may be utilized. There are a number of such machines out in the field and it is desired to be able to retrofit them to accommodate the rotational means 12 and positioning means 13 of the present invention. Such machines do include the first and second torque couplings or clutch and brake 31 and 32 which are electrically controllable and thus it is possible to retrofit such machines by making use of the distributing circuit 50 and also making use of the power handling circuit 74. This power handling circuit imposes certain restraints on the rotational means 12 and positioning means 13, as set forth below.

The spindle rotational means 12 includes the first and second torque couplings 31 and 32, include a means 88 to partially engage each of the torque couplings for torque transmission therethrough, and a means 89 to control the relative average torque transmission of these torque couplings to rotate the spindle from the motor 20 at a speed slower than rotation of the spindle from the motor 20 by actuation of the clutch 31 alone without actuation of the brake 32.

In the simplest configuration only one of the selector switches 61–66 need be used, and only one brush 47 may be used. As an example let us assume that this is the selector switch 66 and the brush 47 in the five o'clock position as shown in FIG. 2. In this manner, the machine tool will be able to control the clutch, neutral, brake or slow rotation condition of each spindle of the spindle carrier as such spindle is indexed into the five o'clock position. It may be desired to stop the spindle from rotating when indexed into this position in order to perform a cross milling or cross drilling operation on the workpiece in the spindle 17. In such case the selector switch 66 would be set in the brake condition as shown in FIG. 2. Just prior to indexing movement the spindle in the three o'clock position will be in the clutch actuation condition. This is because there was an open circuit condition applied to the power handling circuit 74 for that spindle. An open circuit on control conductor 82 will not pass through the breakdown diodes 83 or 84 hence transistors 76 and 77 will be nonconducting. A diode 85 is placed across the series combination of the clutch coil 71 and degaussing coil 73 in order to help collapse the flux thereof. A diode 86 is provided across the series combination of the brake coil 72 and degaussing coil 73 to collapse the flux thereof whenever the brake coil is deenergized.

Figure 7:
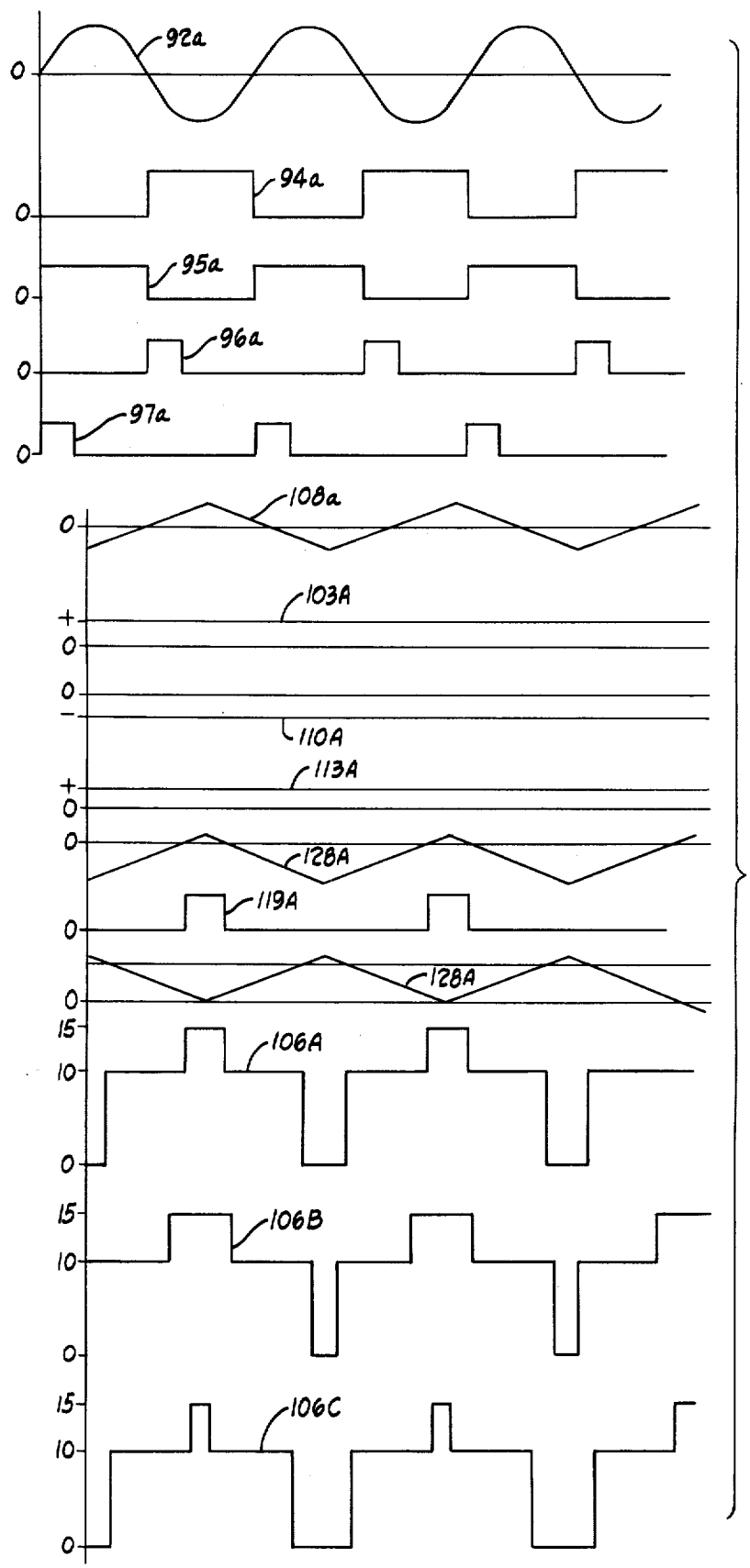
FIG. 7 is a graph of voltages versus time at various places in the circuit of FIG. 4.

FIG. 4 illustrates the control means 89 used in the spindle rotational means 12 and spindle positioning means 13. The axis of the spindle 17 is designated schematically in FIG. 4 and a gear 91 is mounted on this spindle shaft. A similar gear would be mounted on each of the multiple spindles 17. A reluctance pick-up 92 is mounted on the frame of the machine at the five-o'clock position of FIG. 2 to cooperate with the teeth of each of the gears 91 as the particular spindle is indexed into this five o'clock position. A signal proportional to spindle speed is obtained, the signal being 92A as shown in FIG. 7, and is part of the control means 89. As an example, this gear might have 120 teeth, 120 pulses generated per revolution. Because of the tooth spacing and speed of operation, the signal 92A that is produced appears more like a continuous sine wave. In FIG. 4 the signal from the pick-up is fed into an amplifier 93 which amplifies the signal and converts it into a square wave. Two square waves are created by inverters 94 and 95 and these are of the same frequency but 180° out of phase. FIG. 7 illustrates the square waves 94A and 95A obtained from inverters 94 and 95, respectively.

These signals are fed to monostable multivibrators 96 and 97, respectively, and the signals therefrom are illustrated in FIG. 7 as the signals 96A and 97A. These monostable circuits are triggered by each positive going edge of the respective input square wave and each delivers one constant area pulse each time it is triggered. A speed adjustment potentiometer 98 is connected to negative operating voltage. This signal from the potentiometer 98 is summed with signals 96A and 97A by resistors 100, 101 and 102 and fed into an amplifier 103 which, because of capacitor 104 is connected as an integrator. This integrator 103 integrates the series of constant area pulses from signals 96A and 97A and averages them over a period of time and also compares them with the speed adjustment signal 98. The output of this integrator 103 is a signal proportional to the difference between the commanded speed and the actual measured speed. This is the speed error signal and may be either plus for clutch actuation or minus for brake actuation and is used to control the relative level of current in the clutch/brake combination.

As stated above for each spindle there is an electronic control module or power handling circuit 74. This power handling circuit switches the current to the clutch or the brake depending upon the level of the input signal to the circuit 74. If the input voltage is zero volts then the clutch is engaged and the brake is disengaged. If the input voltage signal level is ten volts then both clutch and brake are disengaged. If the input voltage signal level is 15 volts then the clutch is disengaged and the brake is engaged. It should be noted that this power handling circuit 74 is not a part of the present invention, it merely happens to be the existing control module on many machines out in the field and in order to retrofit such machines to accommodate the present invention, it is necessary to adapt the control means 89 in order to work through this power handling circuit 74.

In order to modulate the current in the clutch and brake coils according to the present invention, a pulse width modulated signal is supplied to the clutch and brake coils through the power handling circuit 74. The average current in a clutch or brake coil is then proportional to the width of the pulses. The control means 89 of FIG. 4 has the output terminal 60 on which this pulse width modulated signal appears. This output terminal 60 is connected to bus bar 59, shown in FIG. 2. FIG. 7 shows the signal 60A with only a nominal width of the pulses, with the brake pulses being positive 15 volts and the clutch pulses being zero volts. This would correspond with the relatively narrow pulses 96A and 97A shown in FIG. 7. Curve 60B shows a pulse width modulated signal at the output terminal 60 wherein the brake pulses are increased in width and the clutch pulses are narrowed for more braking action, and FIG. 7 also shows a curve 60C wherein the brake pulses are narrowed and the clutch pulses are widened for greater relative actuation of the clutch.

A triangular wave form generator 108 generates a triangular wave form 108A at a suitable frequency and in one practical embodiment this has been about 100 hertz. This wave form is used to create the pulse width modulated wave forms such as 60B or 60C. The DC error signal 103 from the output of the integrator 103 may be either positive or negative, as stated above, and this is supplied to an amplifier 110. A potentiometer 111 supplies a clutch current bias level to the same inverting input of this amplifier 110. The output of this amplifier 110 is prevented from going positive by a feedback clamping diode 112. The signal is next fed through an inverter 113 and the output signal thereof has a level which is proportional to the positive error signal at the output of the integrator 103 plus a bias signal level. In other words when the DC error signal is negative, the output of inverter 113 remains at the bias signal level. A potentiometer 114 establishes a minimum clutch current signal. This signal is supplied to a summing circuit which includes resistors 115, 116 and 117 to sum this minimum clutch current signal, the positive signal level from the inverter 113 and the triangular wave form from the generator 108. This summed signal is supplied to a summing amplifier 118 and the output thereof is a triangular wave with a DC bias level. This signal is fed to a comparator amplifier 119 which compares this signal to zero voltage or ground level. Therefore output signal 119A from the comparator amplifier 119 is a rectangular pulse the width thereof varying dependent upon the modulating effect of DC levels that are summed together in the summing amplifier 118.

A similar circuit arrangement is provided for the brake coil 72. The DC error signal from the integrator 103 is supplied through an inverter 130 to the inverting input of an amplifier 120. A brake current bias potentiometer 121 also supplies a voltage to this inverting input. A feedback clamping diode 122 keeps the output of amplifier 120 from going positive. The output of the amplifier 120 is fed through an inverter 123 so that if the DC error signal 103A is negative, the output of inverter 123 will be positive. A minimum brake current potentiometer 124 is connected to negative operating voltage and an inverter 131 is connected to the output of the triangular wave generator 108. A summing circuit includes resistors 125, 126 and 127 to sum together the minimum brake current level control, the positive signal level from inverter 123 and the triangular wave. The summed signals are supplied to a summing amplifier 128 and the output thereof is a triangular wave with a DC bias level. This signal is fed to a comparator amplifier 129 which compares the signal to ground and the output thereof is a rectangular pulse whose width will vary depending upon the modulating effect of the DC levels that are summed together in the summing amplifier 128.

The clutch signal from the comparator amplifier 119 is amplified by a transistor 133 the output of which goes to a level setting potentiometer 134 and then through a transistor 135 to the output terminal 60. The brake signal passes through transistor amplifiers 136 and 137 to the lower end of the level setting potentiometer 134, the upper end of which is connected to positive operating voltage.

A safe speed signal is generated by an integrator amplifier 173, FIG. 4, which receives a summed input from the outputs of the two monostable multivibrators 96 and 97 and from a reference potentiometer 174. The setting of this poteniometer sets a safe speed below which the spindle must be operating before there is an output at an output terminal 175.

Figure 5:
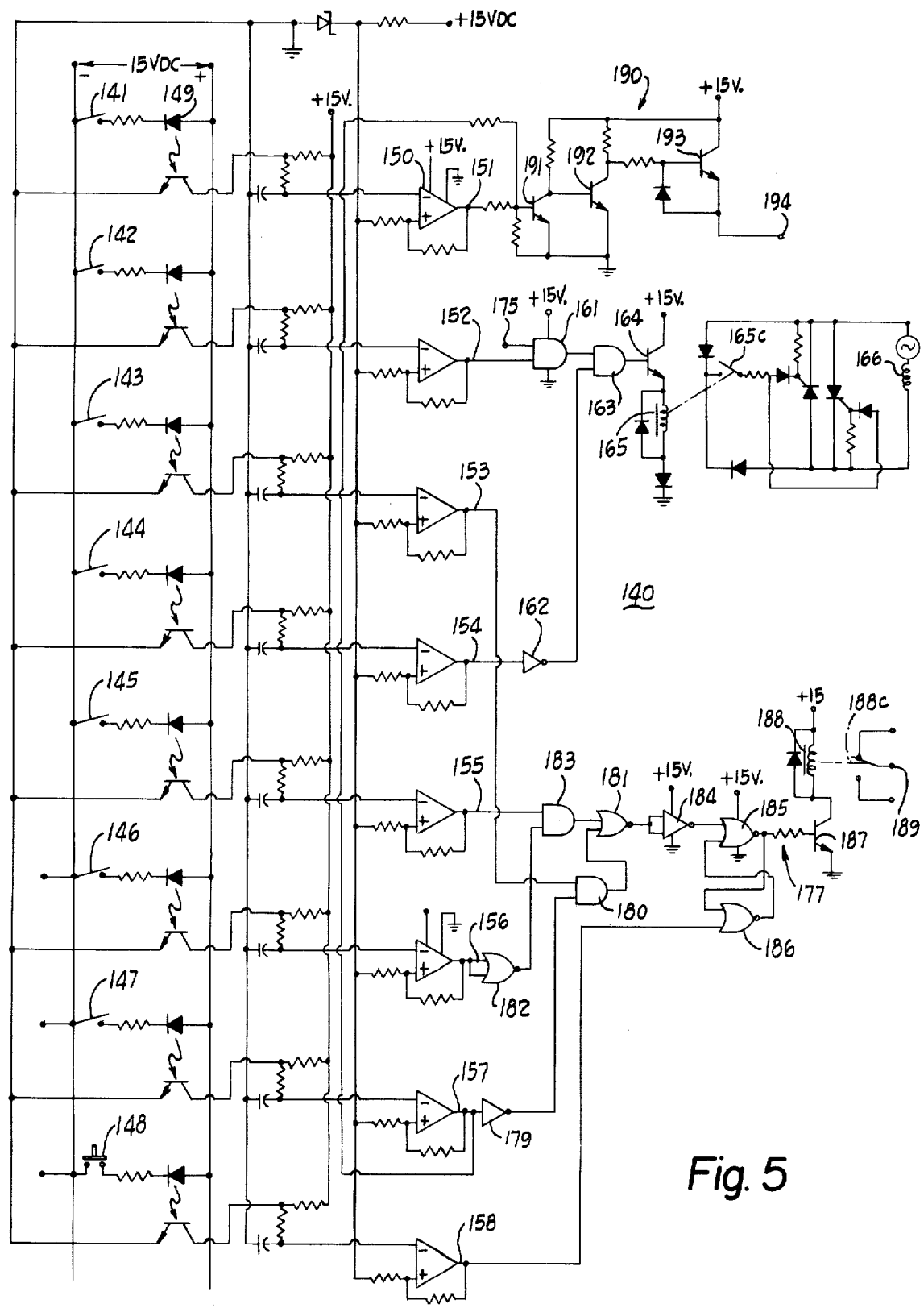
FIG. 5 is a schematic diagram of the machine cycle circuit.
Figure 6:
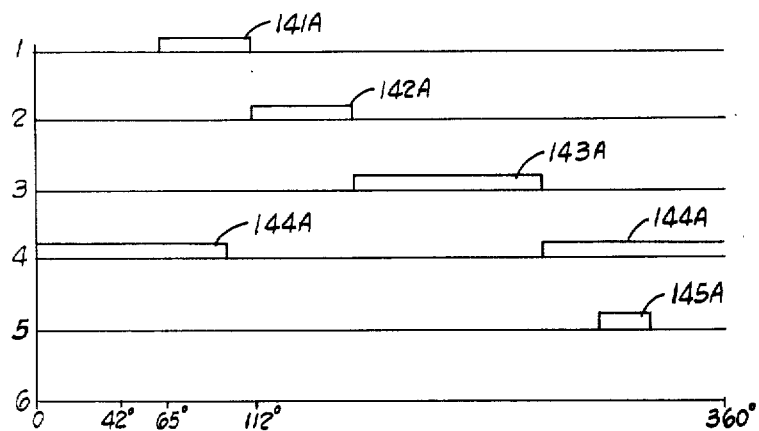
FIG. 6 is a graph of machine cycle actuation times of the switches in FIG. 5.

In order to couple this spindle rotational means 12 and spindle positioning means 13 to the actual machine tool 14 of this embodiment, FIG. 5 illustrates a machine cycle circuit 140 which includes five drum switches 141 through 45. The drum makes one revolution per cycle and with six spindles 17 there will be six cycles per revolution of the spindle carrier 18. The drum switch might be driven off the Geneva drive roller mechanism 26, for example. Each of these five drum switches is buffered by an optical isolator such as isolator 149 and from that isolator has an output through an amplifier, such as amplifier 150, to output cycle terminals 151-155, respectively. Additional switches are connected with the drum switches 141-145. These include a plunger out switch 146, a plunger in switch 147 and a manual reset switch 148. FIG. 6 illustrates by signals 141A-145A the times when the various drum switches 141-145 are actuated closed so that there is an output on the respective cycle output terminal 151-155. The remaining switches 146, 147 and 148 are also coupled through optical isolators and amplifiers to respective cycle output terminals 156, 157 and 158.

The machine cycle circuit 140 includes gate circuits to assure proper operation of the machine tool 14. An AND gate 161 is connected to receive a safe speed signal from the terminal 175 and a positioning signal from the cycle output terminal 152. An inverter 162 is connected to receive a signal from the machine cycle terminal 154. The outputs of these two are connected to inputs of an AND gate 163 and the output thereof feeds a transistor 164 to energize a reed relay 165. The contacts 165C of this reed relay are connected to supply, when closed, a signal to a solenoid 166 which controls the urging of a plunger 167 toward the axis of the spindle 17. This is illustrated diagrammatically in FIG. 4 and when the solenoid 166 is energized the plunger 167 is urged toward the periphery of a locking disc 168 which may have one or more notches 169. These such notches are shown as an illustration. A spring 170 acts on the plunger 167 to urge it outwardly away from the spindle axis. An extension on the plunger 167 is shown actuating the plunger-out switch 146 and when the solenoid 166 urges the plunger 167 into the notch 169, then the plunger-in switch 147 would be actuated. There is one such locking disc 168 on each of these spindles 17.

The machine cycle circuit 140 also includes a machine stop circuit 177. The cycle output terminal 157 is fed through an inverter 179 to an AND gate 180. This has another input from the cycle output terminal 153. The output of AND 180 goes to one input of a NOR gate 181. A similar arrangement leads from the machine cycle terminal 156 through an inverter 182 and the output thereof goes to an AND gate 183 which has another input from the machine cycle terminal 155. The outputs of the AND gates 180 and 183 supply the two inputs of the NOR gate 181. The output thereof is inverted by an inverter 184 and the output supplies one input of a NOR gate 185. This NOR gate is connected in a latch configuration with another NOR gate 186 with one input thereof from the manual reset switch cycle output terminal 158. The output of the NOR gate 185 leads to a transistor amplifier 187 and the output thereof energizes a reed relay 188. Contacts 188C thereof provide an output at terminal 189 to command the machine tool 14 to stop.

A power circuit 190 may be considered an OR gate. When either signal input from the first drum switch through cycle output terminal 151 or the plunger-in switch 147 are high, then a transistor 191 is turned on, a transistor 192 is turned off and a transistor 193 is turned on to provide an output at a terminal 194. This is connected to bus bar 59, FIG. 2. Therefore this supplies power through the distributing circuit 50 to the power handling circuit 74 so that the clutch coil 71 and brake coil 72 may be energized with the pulse width modulation that is a signal 60B or 60C as shown in FIG. 7.

Operation

FIG. 1 illustrates schematically a machine tool 14 with which the invention may be used. Such machine tool may have already existing therein the distributing circuit 50 of FIG. 2 and may have one or more, usually one per spindle, of the power handling circuits 74 therein as shown in FIG. 3. The present invention does not need to operate through such power distributing circuit 50 nor the power handling circuit 74, yet the present invention has been constructed so as to be compatible with such preexisting machines in order to make possible retrofitting machine tools already out in the field.

It may be desired to stop the spindle from rotating when indexed into the five o'clock position, for example, of FIG. 2, in order to perform a cross milling or cross drilling operation on the workpiece in the spindle 17. In such case the selector switch 66 would be set in the fourth position to be connected to the output terminal 60. Just prior to indexing movement the spindle in the three o'clock position will be in the clutch actuation condition. This is because there was an open circuit or zero voltage condition applied to the power handling circuit 74 for that particular spindle. An open circuit on the control conductor 82 will not pass through the breakdown diode 83 or 84 hence transistors 76 and 77 will be nonconducting. The bias resistors 80 and 81 establish normal conduction of the transistor 75 to keep the clutch coil 71 continuously energized during its entire indexing rotation throughout 300° until it starts to move into the five o'clock position. Assuming clockwise indexing rotation of the conductor assembly 35 as viewed in FIG. 2, as soon as the spindle carrier starts its index the brush 47 will engage the next arcuate segment of the first conductor ring 41. At this time its respective arcuate segment of the first conductor ring 41 will be supplied with voltage from the output terminal 60. This will be a signal such as 60A, 60B or 60C as shown in FIG. 7; namely, a pulse width modulated signal.

First, consider what will happen with different voltages applied to conductor segment 41. If 15 volts is applied, then this will pass through the breakdown diode 83 turning on the third transistor 77. This effectively shorts the bias resistor 81 to turn off the first transistor 75. This deenergizes the clutch coil 71. The 15 volts on control conductor 82 will also break down the diode 84 and cause conduction of the second transistor 76. This energizes the brake coil 72 to brake to a stop that particular spindle in the five o'clock position. If only 10 volts were applied on the arcuate segment 41, then this would not break down the breakdown diode 84 but would break down the breakdown diode 83 to disengage the clutch and not engage the brake so that a neutral condition would be established.

The present invention provides the spindle rotational means 12 and the spindle positioning means 13. The spindle rotational means provides rotation of the spindle at relatively low speed, low torque condition utilizing, instead of a separate servo-motor, the normal motor 20 which is used to provide high speed, high torque rotation of each spindle 17. To accomplish this, the slippable clutch 31 is partially engaged and the slippable brake 32 is also partially engaged for a bias or retarding torque against which the clutch will drive the particular spindle. The brake 32 is also used to stop the spindle and may optionally be used to lock the spindle at a desired position.

Figure 8:
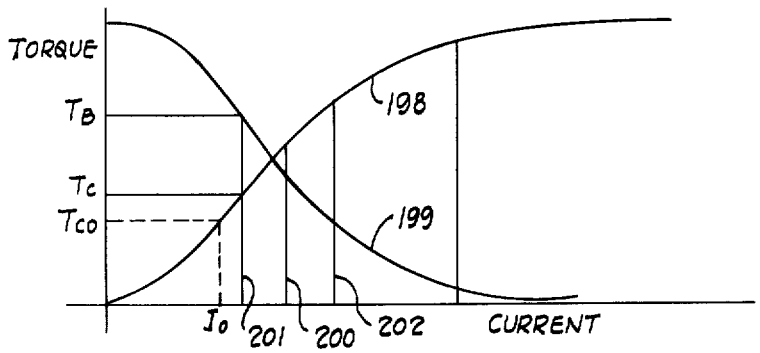
FIG. 8 is a graph of torque versus current.

FIG. 8 illustrates a curve 198 of clutch torque versus current and illustrates another curve 199 of brake torque versus current. If the average current supplied to each of the clutch and brake is at a current value 200, then the torque developed by the clutch will be slightly greater than that developed by the brake and the spindle 17 will be rotated at a slow speed condition. As an example, this might be one revolution per second. If now the clutch current were decreased a small increment to a current value 201 and the brake current were increased a small increment to a current value 202, then the retarding torque would exceed the clutch torque and the spindle would be braked. However, if the opposite condition prevailed, namely, the smaller amount of current value 201 were applied to the brake and the larger current value 202 were applied to the clutch, then the clutch torque would overcome the retarding torque and the spindle would rotate at some low speed. The present invention has the advantage that the clutches and brakes 31 and 32 are multiple disc clutches. A small energization, for example, at about ten percent of the rated current value, will actually pull these clutch and brake discs together to eliminate the mechanical time delay normally associated with appyling such clutch or brake. With the rotation at one revolution per second, the spindle need rotate only one or two revolutions before it is positioned and hence this does not develop any appreciable frictional heat so that there is no harmful effect by having these clutches and brake discs in contact. This partial engagement means 88 of the clutch and brake is established by the clutch current bias level potentiometer 111 and the brake current bias level 121, as shown in the control means 89 of FIG. 4.

The spindle rotational means 12 also includes the control means 89 to control the relative average torque transmission of the first and second torque couplings 31 and 32. Thus the objectives of the varying clutch and brake average current of FIG. 8 will be established. This control means 89 of FIG. 4 accomplishes this control of the relative average torque transmission.

The small increment of change of average current illustrated in FIG. 8 will produce a net increase or net decrease in positive torque. In a typical clutch the current will rise to about 90 percent of the final value in 150 milliseconds when full rated voltage is applied. Full torque is necessary in a machine tool 14 in order to rotate a workpiece bar against the resisting torque of a cutting tool cutting on the end of the bar. However, during idle time when no chips are being cut, the torque requirements to rotate the workpiece bar at a slow speed are quite small. The maximum torque of the clutch 31 might be 150 lb. feet, for example, but perhaps only 10 percent of that is necessary for the slow spindle rotating and spindle positioning. It is possible to cause the control means 89 to supply maximum voltage to produce a torque change of 1 lb. foot per millisecond or a total differential torque change of 2 lb. feet per millisecond. It can be shown by calculation that a braking torque build-up rate of that amount can stop the spindle within one degree of angular rotation starting with a speed of 0.8 revolutions per second.

The present invention has the advantage of the pulse width modulation so that full voltage is applied to either the clutch or brake and this rapidly causes a build-up of the current to achieve the torque change either clutch torque or brake torque.

Spindle positioning may be programmed to occur at any time during the machining cycle, but generally it will occur immediately after the spindle carrier 15 has been indexed. The spindle 17 is stopped by deenergizing the clutch 31 and energizing the brake 32, as described below. When the spindle is stopped, the plunger 167 is urged by the solenoid 166 to ride on the surface of the locking disc 168. The control means 89 causes the spindle 17 to rotate at a slow speed, low torque condition. When the plunger 166 drops into the notch 169, the control means 89 is deactivated by the switch 147 and the brake 32 is turned on.

It could be possible to allow the clutch and brake to each be energized at a small valve and allow the spindle 17 to rotate at whatever speed it would assume. This could be controlled by manually controlling the clutch current bias potentiometer 111 and/or the brake current bias potentiometer 121. However, the present invention provides a feedback signal by means of the gear 91 and reluctance pick-up 92. This feedback signal is generated by the gear 91, which may have 120 teeth, to develop a generally sine wave signal 92A shown in FIG. 7. Amplifier 93 and inverter 94 make the square wave signal 94A of FIG. 7 and the monostable multivibrators 96 and 97 are triggered by each positive going edge of the respective input square wave so that each delivers one constant area pulse each time it is triggered. This series of constant area pulse is integrated and averaged over a period of time by the integrator 103. The speed adjustment potentiometer 98 also supplies a signal to this integrator 103 which is summed by the resistors 100, 101 and 102 so that the output of the integrator 103 is a signal proportional to the difference between the commanded speed and the actual measured speed. This is a speed error signal which may be positive or negative. If it is positive as shown at 103A in FIG. 7, then this will establish a small clutch actuation signal. If it is negative, then this will establish a brake actuation signal. This speed error signal from integrator 103 is used to control the relative level of current in the clutch and brake combination.

Curve 60A of FIG. 7 illustrates a typical condition whereat the brake is partially engaged by the 15 volt pulse portions of this signal wave and the clutch is partially engaged by the zero volt pulse portions of this signal wave. Curve 60B shows that the brake signal pulses have been widened and the clutch signal pulses narrowed for increasing braking torque and this would stop the spindle. Curve 60C shows the opposite condition of narrowed 15 volt braking pulses and widened zero volt clutch pulses and this would rapidly increase the clutch torque for rapid acceleration of the spindle 17. The control means 89 of FIG. 4 accomplishes this function. Let it be assumed that the DC error signal from integrator 103 is a small positive value. This signal is fed into the amplifier 110 and a positive DC level is added to it from the clutch current bias potentiometer 111. This establishes the small bias necessary to provide the partial engagement of the clutch 31. The output of this amplifier 110 is prevented from going positive by the feedback clamping diode 112 and therefore after the inverter 113, the output of this inverter is a signal level proportional to the positive error signal from integrator 103 plus a bias signal level. In other words, when the error signal 103A is negative, the output of inverter 113 remains at the bias signal level established by the potentiometer 111.

The summing amplifier 118 sums the triangular wave form 108A from the generator 108, the positive signal level from inverter 113, and the level from the minimum clutch current potentiometer 114. The output of this summing amplifier 118 is a triangular wave 118A with a DC bias level. The comparator amplifier 119 compares this signal to zero or ground level and the result is a signal 119A as shown in FIG. 7 with the blocks of pulses of varying width. The pulse width will vary depending upon the modulating effect of the DC levels that are summed together in the summing amplifier 118.

A similar circuit is used for the brake with circuit elements 120 through 129 being generally similar to the circuit elements 110 through 119. The inverters 130 and 131 invert the DC error signal and also invert the triangular wave form so that the brake circuit 120-129 will have the same operation as the clutch circuit 110-119. The circuit elements 133-137 combine these varying width pulse signals to provide on the output terminal 60 the signals 60A, 60B or 60C of FIG. 7. Considering first the clutch signal, when a pulse is supplied on the transistor 133 it is turned on, driving the wiper of the potentiometer 134 low which turns off transistor 135 and giving a low or zero condition on output terminal 60, which is what is desired for the clutch condition. When the output of the comparator amplifier 129 of the brake signal is high, transistor 136 is turned on which turns off transistor 137 and this makes the wiper of the potentiometer 134 go to the high or 15 volt condition which turns on transistor 135 and the output terminal 60 will be at the high 15 volt condition. When both outputs from comparator amplifiers 119 and 129 are low, then both transistors 133 and 136 are off and this turns on transistor 137 which establishes a small voltage at the wiper of the potentiometer 134 to partially turn on transistor 135. This transistor partially conducts to establish about a 10 volt output on the output terminal 60. As stated above, when 15 volts is applied on the output terminal 60, then the brake is actuated and when zero volts is supplied on terminal 60, then the clutch is actuated. By pulse width modulation the relative magnitude of the clutch and brake coil currents are controlled to maintain a particular speed, for example, one revolution per second and held at that speed by the feedback from the gear 91.

The spindle rotational means 12 provides the slow speed, low torque rotation of the spindle 17; and includes the pulse width modulated output of the combined clutch and brake signal 60A, B or C. Accordingly, the spindle rotational means 12 includes the circuit components 110 through 137 to control the relative average torque transmission of the clutch and brake.

The present invention also includes the spindle positioning means 13 which, in the embodiment of FIG. 4, may include generally the locking disc 168 and plunger 167. In this circuit of FIG. 4 the position sensing and position holding operations have been combined. The fact that the plunger drops into a notch on the locking discs 168 establishes a position sensing and this also locks the spindle in the particular position.

If a cross drilling operation is all that is desired, only one notch 169 need be provided on the locking disc 168. If a pair of flats are to be cross milled on the workpiece at 3 equispaced positions on the workpiece in order to achieve a hexagonal cross section, then three such notches 169 may be required, and this is what is illustrated in FIG. 4. In order to complete the spindle positioning control 13, a sequence of events occurs in accordance with the machine cycle as signalled by the drum switches 141-145. FIG. 6 illustrates the sequence of the various switches being on with signal 141A indicating when the drum switch 141 is closed and accordingly signals 142A-145A indicating when the switches 142 through 145, respectively, are closed by rotation of the cycle drum. Drum switch 141 is used to signal when the brake is on; drum switch 142 is used to signal when positioning of the particular spindle is in progress; the drum switch 143 indicates when the spindle is in position, e.g. for cross drilling, etc.; drum switch 144 indicates when the plunger 167 has been given a signal to move out of the notch; and the fifth drum switch 145 is a switch to signal when the plunger should be moved out of the notch 169.

Braking of the spindle occurs, for example, at 65° of the indexing drum, see FIG. 6. At this time the braking signal switch 141 is closed. This turns on transistor 191, turns off 192, and turns on 193 to give a high speed on output terminal 194. This is 15 volt energization for the brake coil 72 to stop the spindle.

The solenoid 166, when energized by closing of the relay contacts 165C, urges the plunger 166 toward the periphery of the locking disc 168 so that it may enter the notch when the locking disc is rotated into the proper position. The plunger cannot be commanded to move into the notch 169 until three conditions are satisfied. The three conditions which must be satisfied are controlled by the circuit elements 161, 162 and 163. (1) The cycle drum must be in the positioning mode to actuate the second drum switch 142. (2) The plunger out command from the fourth drum switch 144 must not occur. (3) The spindle speed must be below a set safe level as determined by the integrator amplifier 173. The signals from the second drum switch 142 and the safe speed signal on terminal 175 are supplied to the AND gate 161 and when both are high there is an output from this gate to the AND gate 163. The absence of a signal from the plunger out command fourth drum switch 144 will be a low level and this is inverted by the inverter 162 to be a high on the other input of the AND gate 163. Thus when the two high inputs on AND gate 163 coincide there is a high output from this gate 163 to turn on transistor 164 and energize the reed relay 165 for an output to the solenoid 166.

When the plunger moves into the notch 169, the plunger-out switch 146 is deactuated and the plunger-in switch 147 is actuated. The power circuit 190 is actuated at this time because the plunger-in switch 147 is closed. This provides a high condition on the input of the AND gate 190 to turn on transistor 191, turn off 192 and turn on transistor 193 for a high output condition on the output terminal 194. This terminal is connected to bus bar 59, along with terminal 60. This supplies 15 volts operating voltage so that the brake 32 may be engaged in the particular spindle in the five o'clock position of FIG. 2.

The machine stop circuit 177 is utilized to guard against certain conditions which are not allowed. There are two such conditions; (1) when the plunger 166 does not move into a notch 169 during the time that the spindle is in position and the third drum switch 143 is closed; (2) if the plunger is not moved out of the notch, as sensed by the plunger-out switch 146 when the end of the cycle occurs as signalled by the plunger-out fifth drum switch 145. The first of these two conditions is sensed by the inverter 179 and gate 180. When the plunger-in switch 147 is actuated, this makes a high condition on inverter 179 for a low condition on the AND gate 180. This disables this gate for a low condition on the output thereof. If the plunger does not drop into the notch as it is supposed to, then the plunger-in switch 147 will not be actuated and there will be a low condition on the input of the inverter 179 for a high condition on the output thereof and this combined with the high output from the third drum switch 143 will make a high output condition on the output thereof. This high is on an input of the NOR gate 181 and this gives a machine stop command as follows. This high on the input of 181 gives a low on the output for a high on the output of inverter 184. This high gives a low on the output of NOR gate 185 and this turns off the transistor 187 deenergizing the relay 188 to give a machine stop signal.

The second of the two above conditions is sensed by the inverter 182 and gate 183. Near the end of the cycle the fifth drum switch 145 is closed and by that time the plunger is supposed to be moved out to actuate the plunger-out switch 146. If this switch is not actuated, and there is a low at the cycle output terminal 156, there will be a high at the output of inverter 182 and the two highs on the input of the AND gate 183 make a high on the output thereof. This high, similar to the condition above, makes a low on the output of 181, a high on the output of gate 184 and a low on output of gate 185 to turn off the transistor 187 and give a machine stop signal.

The manual reset switch 148 may be actuated whenever the fault condition has been cleared. Closing this switch gives a high condition at the cycle output terminal 158, a low condition on the output of the NOR gate 186 and this gives a high output condition on the output of the NOR gate 185 to energize reed relay 188 and terminate the machine stop signal. This high on the output of NOR gate 185 acts through the latching connections of gates 185 and 186 to latch the output 185 high even though the manual reset switch 148, which will be momentary closing switch, is again opened.

Modification

Figure 9:
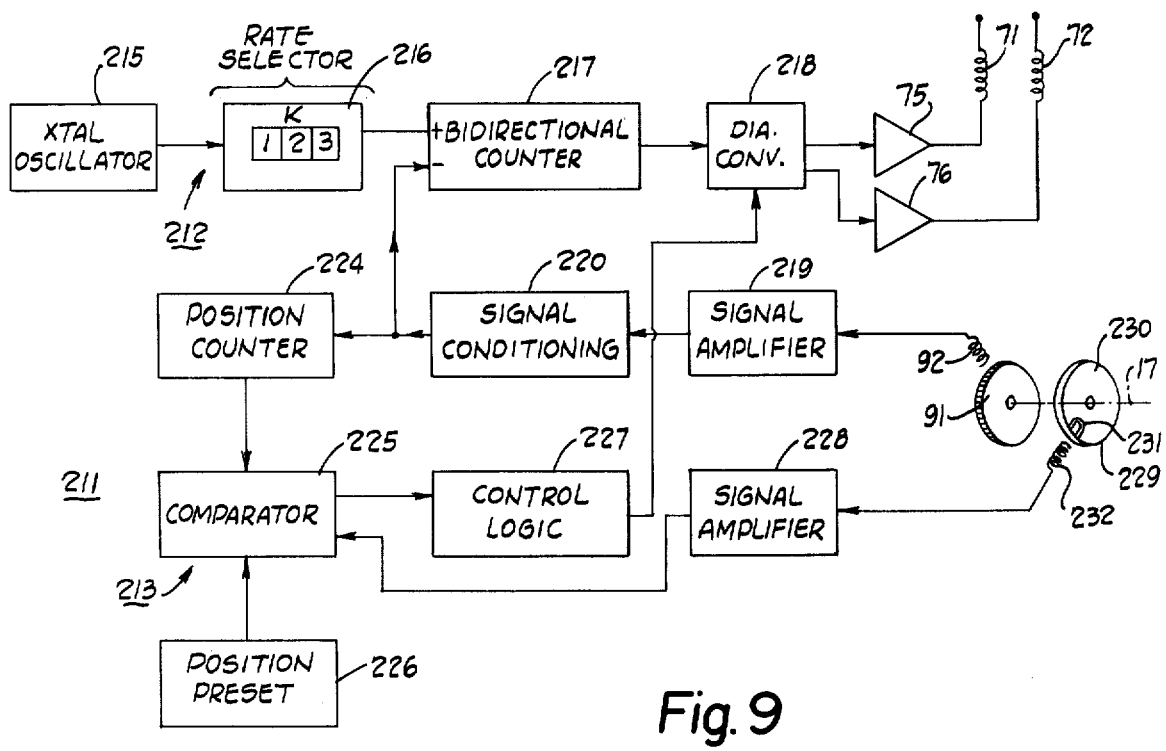
FIG. 9 is a schematic diagram of a modified rotational and positioning system.

FIG. 9 illustrates a modification of the invention wherein the position sensing and position holding mechanisms are separated. The machine tool 14 of FIG. 1 is again used with the system of FIG. 9 and the distributing circuit 50 of FIG. 2 and the power handling circuits 74 of FIG. 3 may also be used. The existing clutch 31 and brake 32 of the machine tool are used, partially energized, to provide low speed, low torque rotation of the spindle 17. The gear 91 and reluctance pick-up 92 are again used to sense spindle speed and angular incremental position.

FIG. 9 illustrates a control circuit 211 which includes a spindle rotational means 212 to rotate the spindle at a slow speed, low torque condition, and spindle positioning means 213 to position and hold the spindle at a selected arcuate position. The spindle rotational means 212 includes an oscillator 215, a rate selector 216, a bidirectional counter 217, a digital to analog converter 218, amplifier 75 to the clutch coil 71, and amplifier 76 to the brake coil 72. This spindle rotational means 212 also includes a feedback signal from the spindle gear 91 and reluctance pick-up 91 through a signal amplifier 219 and a signal conditioner 220. The oscillator 215 may run at some established frequency, for example, by being a crystal controlled oscillator. The rate selector 216 may have some switches to select the proper divisor to divide the oscillating frequency to a desired running frequency. As an example, this might be 120 hertz in order to achieve one revolution per second. This selected frequency is fed to the plus input of the bidirectional counter 217 and the feedback signal from the gear wheel 91 is fed to the negative input of this bidirectional counter. Assuming 120 teeth on the gear and assuming proper speed operation, there will be 120 hertz signal fed to the minus input of the bidirectional counter. In this case the bidirectional counter would have zero output and the digital to analog converter 218 would have a constant output to continue energization of the clutch and brake amplifier 75 and 76 at a constant value. This would give the partial energization to the clutch coil 71 and brake coil 72 to maintain that preset speed.

However, if the speed of the spindle is too high, then the signal fed back from the reluctance pick-up 92 will be a higher frequency than 120 hertz. This will make the bidirectional counter 217 count down to have a negative pulse counter output. This will be converted by the digital to analog converter 218 to increase the average current to the brake amplifier 76 and brake coil 72 relative to the average current supplied to the clutch amplifier 75 and clutch coil 71. Conversely, if the speed of the spindle is below the selected speed, then the feedback signal will be less than 120 hertz and this fed to the bidirectional counter 217 will make it have a positive pulse count output. This will be supplied to the digital to analog converter 218 so that it increases the average current to the clutch amplifier 75 relative to that supplied to the brake amplifier 76. This would increase the speed of the spindle 17. The digital to analog converter 218 may be similar to the control means 89 of FIG. 4 wherein a pulse width modulated signal is provided for both the clutch and the brake and these are combined as by the amplifiers 133–137 to provide a combined signal for the clutch and brake in order to be utilized by the power handling circuit 74 of FIG. 3.

The spindle positioning means 213 includes the signal from the gear 91, more specifically, from the signal conditioning unit 220 and also includes a position counter 224, a comparator 225, a position preset circuit 226, a control logic circuit 227, a signal amplifier 228 and reference means 229. The spindle positioning means 213 operates by receiving a signal which is basically a pulse generated for each increment of spindle shaft rotation. This signal is received from the reluctance pick-up 92 and, as in the above example, this might be 120 pulses per revolution of the spindle 17. This signal is fed to the position counter 224 which accumulates and supplies the count to the comparator 225. This comparator 225 compares this counted input with that obtained from the position preset circuit 226. A reference signal is required from the reference means 229 in order to identify a reference position. This reference means 229 may be a disc 230 on the spindle shaft which contains a magnet 231 which will give one signal impulse per revolution to a pick-up coil 232. This will be a sharp pulse once per revolution amplified by the signal amplifier 228 and fed to the comparator 225. This will start the comparator 225 in action so that this comparator will compare the position preset with the pulses being counted from the gear wheel 91. When this counts to zero, a stop command will be given by the comparator 225 to the control logic circuit 227. This supplies a signal to the digital to analog converter 218 which will cause deenergization of the clutch coil 71 and energization of the brake coil 72 to stop and hold the spindle 17 in the desired position.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and circuit elements may be resorted to without departing from the spirit and scope of the invention as hereinafter claimed.

What is claimed is:

1. A machine tool having a motor connectable to rotate a spindle,
   wherein the improvement comprises,
   spindle rotational means including,
   first and second torque couplings with said first coupling connected between said motor and said spindle to rotate the spindle directly in proportion to the motor speed and said second coupling connected to said spindle to establish a different speed condition of said spindle,
   means to partially engage each of said torque couplings for torque transmission therethrough,
   and means to control the relative average torque transmission of said first and second torque couplings to rotate said spindle from said motor at a speed slower than rotation of said spindle from said motor by actuation of said first torque coupling without actuation of said second torque coupling.

2. A machine tool as set forth in claim 1, wherein said first torque coupling is a clutch and said second torque coupling is a brake.

3. A machine tool as set forth in claim 1, wherein said partial engaging means includes means to develop a variable first control signal,
   means to develop a variable second control signal,
   and means to apply said first and second control signals to control partial actuation of said first and second torque couplings, respectively.

4. A machine tool as set forth in claim 1, wherein said first and second torque couplings are electrically controllable clutches and brakes, respectively.

5. A machine tool as set forth in claim 1, wherein said control means includes means to establish a desired speed of rotation signal of said spindle.

6. A machine tool as set forth in claim 5, wherein said control means includes feedback means connected to be responsive to the speed of rotation of said spindle,
   and means to compare said desired speed signal with said feedback signal to obtain an error signal controlling said torque couplings.

7. A machine tool as set forth in claim 3, wherein said first control signal development means develops a pulse width modulated control signal.

8. A machine tool as set forth in claim 3, wherein said second control signal development means develops a pulse width modulated control signal.

9. A machine tool as set forth in claim 3, wherein said application means includes means to combine said first and second control signals into a common signal having three states.

10. A machine tool as set forth in claim 9, wherein said common signal is a DC signal having three different levels including zero and two different levels of the same polarity.

11. A machine tool as set forth in claim 10, wherein said two different levels of the same polarity establish a pulse width modulated control signal for each of the first and second torque couplings.

12. A machine tool as set forth in claim 1, including spindle angular positioning means to establish the stopped position of the spindle in a predetermined angular position.

13. A machine tool as set forth in claim 12, wherein said angular positioning means includes means to sense the speed of rotation of said spindle, and reference means to determine a particular rotational position of said spindle.

14. A machine tool as set forth in claim 12, wherein said angular positioning means includes position sensing means and position holding means.

15. A machine tool as set forth in claim 14, wherein said position holding means is a positive lock on the rotational position of said spindle.

16. A machine tool as set forth in claim 14, wherein said position holding means includes said second torque coupling being a friction brake, and includes means to de-actuate said first torque coupling and to actuate said friction brake.

17. A machine tool as set forth in claim 14, wherein said position sensing and position holding means includes a disc rotatable in accordance with said spindle and having a peripheral notch, and a plunger engageable with said notch to establish the spindle in a particular angular position when engaged in said notch.

18. A machine tool as set forth in claim 17, including means to urge said plunger toward engagement with said disc.

19. A machine tool as set forth in claim 17, wherein said first and second torque couplings are a clutch and brake, respectively, and said position sensing and holding means includes means responsive to said plunger engaging said notch to de-actuate said clutch and to actuate said brake.

20. A machine tool as set forth in claim 19, wherein said plunger responsive means includes switch means connected to be responsive to movement of said plunger.

* * * * *